Patented Dec. 30, 1930

1,786,766

UNITED STATES PATENT OFFICE

HAMILTON MERRILL, OF SOUTH ORANGE, NEW JERSEY, ASSIGNOR TO TOWER MANUFACTURING CO., INC., A CORPORATION OF NEW YORK

PROCESS OF MANUFACTURE OF PARA-NITRANILINE

No Drawing. Application filed June 11, 1925, Serial No. 36,552. Renewed May 28, 1926.

This invention relates to a new process of manufacture of para-nitraniline, and more specifically to the process wherein this compound is recovered in a relatively high degree of purity by a novel process of extraction.

In previous processes for the production of para-nitraniline from para-nitro-chlor-benzol and ammonia in an iron autoclave, difficulty has been encountered in that brownish by-products have formed whereby the final product was contaminated, and no practical way has hitherto been found for removing such impurities. The proposal that the iron autoclaves employed should be replaced by porcelain, stoneware or enamel has met with the objection of higher cost and greater inconvenience.

It is accordingly an object of this invention to overcome these difficulties and make pure para-nitraniline.

It is a further object to employ a steel autoclave, without resorting to any porcelain, stoneware or enamel structures.

A further object is to use commercial para-nitro-chlor-benzol without resorting to a previous purification process.

A still further object of the invention is to obtain a high conversion, and consequently a good yield, of the product, as near theoretical as possible.

Other and further objects of the invention will appear as the following description proceeds.

In accomplishing these objects it is recommended to proceed according to the hereinafter-described preferred embodiments of the invention, but it is to be understood that these are illustrative and not limiting. Accordingly, the following procedure may be adopted.

A steel autoclave is charged with 2600 pounds of aqueous ammonia having a density of 24° to 26° Bé., and 200 pounds of para-nitro-chlor-benzol. The temperature is gradually raised to 160° C. and the heating continued at about 160° to 165° C. for about sixteen hours. The pressure generated by the reaction in the autoclave is then released to about 100 pounds and the charge is blown under its own pressure into a closed tank containing about 50 pounds of hydrated lime. The pressure then drops somewhat. Excess of ammonia and para-nitro-chlor-benzol are then distilled off from the charge by means of the injection of live steam into the charge. The pressure is then raised to about 60 to 65 pounds by means of the injection of live steam into the tank, the steam having a temperature of about 126° C., and the charge is thereupon filtered through an iron filter press. The filtrate is then allowed to cool and the pure para-nitraniline is allowed to precipitate out from the filtrate, and finally filtered off. The first filtering operation should be conducted while the mass or charge is hot so that the para-nitraniline will under these conditions remain in solution until the time that the filtrate is cooled.

Another mode of procedure is as follows:

A steel autoclave is charged with 2100 pounds of aqueous ammonia having a density of 25° to 26° Bé., and 200 pounds of commercial para-nitro-chlor-benzol are added. The temperature is raised to about 162° C. and kept at about 162° to 167° C. for about sixteen hours. The autoclave is thereupon allowed to cool and the charge is blown into a tank containing about 50 to 55 pounds of hydrated lime. An amount of caustic soda (NaOH), chemically equivalent to 50 pounds of hydrated lime may be used instead of the lime. The excess of ammonia and para-nitro-chlor-benzol are steam-distilled off. When all of the ammonia has been expelled to the recovery system the pressure in the tank is raised by live steam to 40 to 50 pounds, and the charge is filtered while hot. The impurities remain behind while the para-nitraniline filters through into the filtrate and is therein separated by suitable cooling, and thereafter recovered.

It has been found that the proportion of aqueous ammonia when using the density specified, should be about 10 to 15 parts by weight as this insures the production of a clear product. It is also very advantageous to stay within the temperature ranges specified.

In the examples given the use of hydrated lime and sodium hydroxide has been specified, and the former is particularly advantageous because of the low cost and the absence of carbonates or carbon dioxide, which have been found to seriously interfere with the ammonia recovery which, of course, is a very desirable—if not a necessary—feature of the process, in view of the great excess of ammonia used and the loss which would be occasioned if it were not recovered. Other alkalis may be used but it is not desired to employ alkali carbonates. Equivalents of ammonia having an amine root capable of combining with a benzene nucleus in the para position can, of course, be employed. As local overheating of the autoclave tends to the formation of by-products or decomposition products, any suitable method of heating the autoclave by means of a jacket containing oil or superheated steam will tend to decrease the amount of impurities formed and thus decrease the difficulty of purifying the finished product.

By the methods described in the foregoing examples, wherein the charge is directly filtered while hot through the filter press while the para-nitraniline is in solution, there is avoided any necessity for first cooling the charge and precipitating the para-nitraniline, filtering off the mother liquor and thereafter again effecting a solution of the para-nitraniline in order to filter it and recover it. Thus extra steps requiring the use of additional apparatus with the attendant expense of cooling and handling the materials is avoided with a very distinct improvement in the economies of the process.

In stating that the alkali should be free from $CO_2$ it is meant that no detrimental quantities should be present; slight amounts could of course be tolerated.

As many different embodiments of this invention may be made without departing from the principles thereof, it is not intended to limit the patent to the features of the above-described embodiments except as pointed out in the following claims.

Claims:

1. A process of manufacturing para-nitraniline which consists in heating para-nitro-chlor-benzol with ammonia, treating with an alkali, filtering the charge while hot enough to keep the nitraniline in solution, and recovering the purified product in the filtrate.

2. A process of manufacturing para-nitraniline which consists in heating para-nitro-chlor-benzol with ammonia, treating the product with an alkali free from carbon dioxide and carbonates, filtering the charge in the presence of the original mother liquor while hot enough to keep the nitraniline in solution, and recovering the purified product in the filtrate.

3. A process of manufacturing para-nitraniline which consists in heating para-nitro-chlor-benzol with ammonia, treating the product with hydrated lime, filtering the charge in the presence of the original mother liquor while hot enough to keep the nitraniline in solution, and recovering the purified product in the filtrate.

4. A process of manufacturing para-nitraniline which consists in heating para-nitro-chlor-benzol with a large excess of aqueous ammonia of 24° to 26° Bé., treating the product with an alkali, filtering the charge in the presence of the original mother liquor while hot enough to keep the nitraniline in solution, and recovering the purified nitraniline in the filtrate.

5. A process of manufacturing para-nitraniline which consists in heating para-nitro-chlor-benzol with ammonia at a temperature of 160° to 170° C., treating the product with an alkali free of $CO_2$, filtering the charge in the presence of the original mother liquor while hot enough to keep the nitraniline in solution, and recovering the purified product in the filtrate.

6. A process of manufacturing para-nitraniline which consists in heating para-nitro-chlor-benzol with a large excess of aqueous ammonia of about 24° to 26° Bé. at a temperature of 160° to 170° C., treating the product with an alkali, filtering the charge in the presence of the original mother liquor while hot enough to keep the nitraniline in solution, and recovering the purified nitraniline in the filtrate.

7. A process of manufacturing para-nitraniline which consists in heating para-nitro-chlor-benzol with a large excess of aqueous ammonia at a temperature of 160° to 170° C., treating the product with hydrated lime, filtering the charge in the presence of the original mother liquor while hot enough to keep the nitraniline in solution, and recovering the purified nitraniline in the filtrate.

8. A process of manufacturing para-nitraniline which consists in heating para-nitro-chlor-benzol with ammonia at a temperature of 160° to 170° C., treating the product with hydrated lime, filtering the charge in the presence of the original mother liquor while hot enough to keep the nitraniline in solution, and recovering the purified product in the filtrate.

9. A process of manufacturing para-nitraniline which consists in heating para-nitro-chlor-benzol with ten to fifteen parts of aqueous ammonia of 24° to 26° Bé. at 160° to 170° C. in a steel autoclave, treating the charge with hydrated lime, distilling off the excess of ammonia and para-nitro-chlor-benzol, heating the charge sufficiently to hold the para-nitraniline in solution, and filtering off the impurities while hot to recover the purified product in the filtrate.

10. In a process of manufacturing para-nitraniline from para-nitro-chlor-benzol and ammonia, the step consisting in treating the charge after reaction with hydrated lime.

11. The process of claim 1 wherein a steel autoclave is used.

12. A process of manufacturing para-nitraniline which consists in heating para-nitro-chlor-benzol with ammonia, treating the product with an alkaline substance that will expel ammonia from its solutions, filtering the charge in the presence of the original mother liquor while still hot from the said original heating and maintaining it hot enough to keep the nitraniline in solution, and recovering the purified nitraniline product in the filtrate.

In testimony that I claim the foregoing, I have hereunto set my hand this 10th day of June, 1925.

HAMILTON MERRILL.